United States Patent
Fedak (10) Patent No.: US 11,250,494 B2
(45) Date of Patent: Feb. 15, 2022

(54) CUSTOMER LOCATING AND DELIVERY

(71) Applicant: NCR Corporation, Duluth, GA (US)

(72) Inventor: Honza Fedak, Colleyville, TX (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 14/473,173

(22) Filed: Aug. 29, 2014

(65) Prior Publication Data

US 2016/0063606 A1 Mar. 3, 2016

(51) Int. Cl.
| | |
|---|---|
| *G06Q 30/06* | (2012.01) |
| *G06Q 50/12* | (2012.01) |
| *H04W 4/021* | (2018.01) |
| *G06Q 20/20* | (2012.01) |
| *H04L 29/08* | (2006.01) |
| *G06Q 10/08* | (2012.01) |
| *G06Q 20/32* | (2012.01) |
| *G01S 5/02* | (2010.01) |
| *G01S 5/04* | (2006.01) |
| *G01S 1/02* | (2010.01) |
| *G01S 5/00* | (2006.01) |

(52) U.S. Cl.
CPC ........ *G06Q 30/0635* (2013.01); *G01S 5/0252* (2013.01); *G01S 5/04* (2013.01); *G06Q 10/08* (2013.01); *G06Q 20/20* (2013.01); *G06Q 20/322* (2013.01); *G06Q 20/3224* (2013.01); *G06Q 50/12* (2013.01); *H04L 67/18* (2013.01); *H04W 4/021* (2013.01); *G01S 1/02* (2013.01); *G01S 5/00* (2013.01); *G01S 5/02* (2013.01); *H04L 67/12* (2013.01)

(58) Field of Classification Search
CPC ........ G06Q 50/12; G06Q 30/02; G06Q 30/06; G06Q 20/20; G06Q 20/32; G06Q 20/322; H04L 29/06; H04L 69/329; H04W 4/00; H04W 4/02

USPC .......................................................... 235/379
See application file for complete search history.

(56) References Cited

U.S. PATENT DOCUMENTS

| | | | | |
|---|---|---|---|---|
| 6,026,375 A | * | 2/2000 | Hall ..................... | G06Q 10/08 701/533 |
| 6,055,434 A | * | 4/2000 | Seraj ..................... | G01S 5/0045 455/456.1 |

(Continued)

FOREIGN PATENT DOCUMENTS

WO    2013/090367    6/2013

OTHER PUBLICATIONS

European Search Report in co-pending European patent application EP15182236.8 dated Jan. 22, 2016.

*Primary Examiner* — Thien M Le
*Assistant Examiner* — Tae W Kim
(74) *Attorney, Agent, or Firm* — Schwegman, Lundberg & Woessner (57) ABSTRACT

Various systems, methods, and apparatuses are described for locating a patron and delivering an order. One example method may comprise detecting a mobile device of a customer at an establishment. The example method may further comprise determining a location of the mobile device of the customer within the establishment. The example method may further comprise linking the determined location to an order placed by the customer. The example method may further comprise enabling delivery of the order to the customer at the determined location. Similar and related methods, apparatuses, systems, and computer program products are also provided.

11 Claims, 5 Drawing Sheets

(56) References Cited

U.S. PATENT DOCUMENTS

| | | | |
|---|---|---|---|
| 7,376,584 B1* | 5/2008 | Weixel | 705/17 |
| 8,866,673 B2 | 10/2014 | Mendelson | |
| 9,161,174 B2 | 10/2015 | Parrish et al. | |
| 2003/0197613 A1* | 10/2003 | Hernandez et al. | 340/572.8 |
| 2004/0054592 A1* | 3/2004 | Hernblad | G06Q 20/32 |
| | | | 705/15 |
| 2004/0068441 A1* | 4/2004 | Werbitt | 705/16 |
| 2004/0129770 A1 | 7/2004 | Masuno | |
| 2004/0179492 A1* | 9/2004 | Zhang | H04W 24/10 |
| | | | 370/331 |
| 2004/0210621 A1* | 10/2004 | Antonellis | 709/200 |
| 2005/0246230 A1* | 11/2005 | Murray | 705/14 |
| 2012/0078673 A1 | 3/2012 | Koke et al. | |
| 2013/0203436 A1 | 8/2013 | Hohteri et al. | |
| 2015/0348146 A1* | 12/2015 | Shanmugam | G06Q 30/0603 |
| | | | 705/71 |
| 2015/0382144 A1* | 12/2015 | Lopez | H04W 4/023 |
| | | | 455/456.2 |
| 2016/0048775 A1* | 2/2016 | Zibell | G06Q 10/02 |
| | | | 705/5 |

* cited by examiner

CUSTOMER LOCATING AND DELIVERY

BACKGROUND OF THE INVENTION

The advancement of technology has broadened the capabilities of devices, creating opportunities for new and advanced solutions to common problems. Establishments, such as retailers and food service providers, want to provide fast, reliable service to their customers using the latest technologies while keeping costs down. Similarly, customers want to use the latest technology to simplify their transactions at these establishments while maintaining privacy and security.

Customers frequently wish to use their own mobile devices to facilitate their transactions. Many customers wish to place orders for products and services via their mobile devices. For example, some customers may desire to place a food order for a restaurant from their mobile device, in some cases before arriving at the restaurant. Establishments may have difficulty determining when is the appropriate time to begin preparing the customer's order. The establishment may further find it difficult to know when the customer has arrived expecting delivery of the order or where to find the customer to deliver the order. To do so would require the customer to check-in with a staff member upon arrival and for the staff member to pass the information on elsewhere in the establishment as needed.

Accordingly, it may be desirable to provide a method for locating a patron that has placed an order from a mobile device and delivering the order to that customer that does not require additional check-in procedures that the customer must perform or that requires staff members to facilitate, thereby avoiding the above, and other, drawbacks associated with the current art.

BRIEF SUMMARY OF THE INVENTION

Various embodiments of the present invention provide systems, methods, apparatuses, and computer program products for locating a patron and delivering an order.

An example method for locating a patron and delivering an order may comprise detecting a mobile device of a customer at an establishment; determining a location of the mobile device of the customer within the establishment; linking the determined location to an order placed by the customer; and enabling delivery of the order to the customer at the determined location.

An example method for locating a patron and linking an order to that location may comprise calculating, via a processor, a location of a mobile device of a customer within an establishment using beacon signal information received by the mobile device; and linking the determined location to an order placed by the customer.

An example method for locating a patron and delivering an order may receiving an order from a customer located remotely from a restaurant; detecting arrival of the customer at the restaurant; determining, via a processor, a location where the customer is seated based at least in part on beacon signal information received from a mobile device of the customer; and facilitating delivery of the order to the customer at the location of the customer.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Various embodiments of the present invention provide a way for an establishment to detect the presence of a customer or patron that has placed an order online, to locate the customer within the establishment, and to prepare and deliver the customer's order to the customer's location without further input from the customer. For example, a restaurant may enable a customer to place an order for food from a remote location or from her mobile device. The customer may then enter the restaurant and sit at a table of her choosing without interacting with any restaurant staff. The restaurant detects the presence of the customer and the particular table where the customer is seated, for example using one or more beacons associated with the restaurant or a specific table in the restaurant. The restaurant may begin preparing the customer's order after detecting the arrival of the customer. After the customer's order is ready, the order may be delivered to the customer at the table where the customer is seated.

Figure 1:
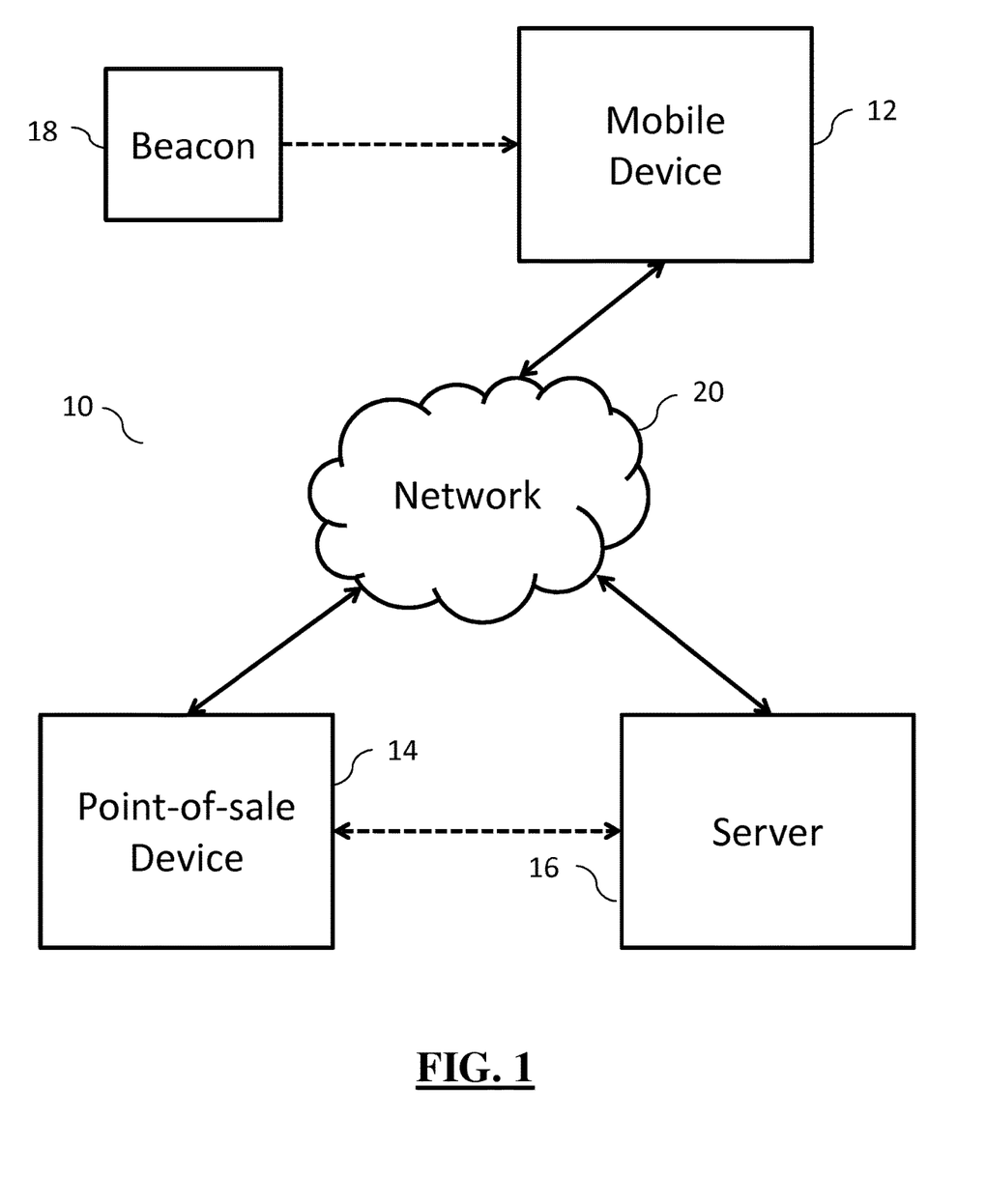
FIG. 1 provides an illustration of one embodiment of an architecture that can be used to practice various aspects of the present invention.

FIG. 1 provides an illustration of a system 10 according to various embodiments of the present invention. An example system 10 may comprise a mobile device 12, point-of-sale device 14, a server 16, and/or a beacon 18. For instance, a mobile device 12 may comprise a smartphone device, mobile telephone, mobile computer, mobile point-of-sale device, wearable mobile device, portable digital assistant (PDA), laptop computer, gaming device, electronic tablet, or any other type of similar electronic device; the point-of-sale device 14 may comprise a fixed point-of-sale terminal, a mobile or handheld point-of-sale device, and/or the like; the server 16 may comprise a point-of-sale server, web server, and/or the like; and the beacon 18 may comprise a beacon device configured to communicate according to a wireless standard or technology (e.g., Radio-frequency identification (RFID), Bluetooth®, Bluetooth® Smart, Bluetooth® Low Energy (BLE), Near Field Communication (NFC), Wi-Fi, other radio frequency transmissions, and/or the like). The beacon 18 may be powered by battery, wired connection, wall plug or adapter, or another device to which it is connected. Certain embodiments may lack one or more of the described entities of the system 10 and/or may have more than one of a particular entity.

The various entities of the system 10 may be in communication with one another, for example via network 20. Network 20 may comprise wired and/or wireless connections.

In various embodiments, the system 10 may be implemented at an establishment where a commercial transaction takes place, such as a retail or restaurant environment. The establishment may operate one or more point-of-sale devices 14, one or more servers 16, and/or one or more beacons 18. The one or more beacons 18 may be connected to a point-of-sale device 14 and/or server 16 either physically or via wireless connection.

In some instances, the server 16 may be at a location separate from the establishment, such as a central office, or separate from the point-of-sale devices 14, such as a back office.

The establishment may have one or more customers. Some of the customers of the establishment may possess a mobile device 12. The mobile devices 12 of the customers may interact with the point-of-sale devices 14, servers 16, and/or beacons 18. For example, the mobile devices 12 may be configured to execute an application that provides functionality associated with the products and/or services offered by the establishment to the customer. The application may be a mobile app, web app, web site, and/or the like. In some instances, the application may be provided by the establishment, and in other instances the application may be a third party application that provides the functionality related to the establishment.

It should be noted that other system architectures are contemplated that may be used to practice various aspects of the invention. Thus, the system 10 provided in FIG. 1 is for illustrative purposes only and should not be construed to limit the scope of the invention. Further, while FIG. 1 illustrates certain system entities as separate, standalone entities, the various embodiments are not limited to this particular architecture.

Turning to the operation of the system 10, in various embodiments, a point-of-sale device 14 associated with an establishment may be configured to enable the initiation of a transaction with a customer. In this regard, the point-of-sale device 14 may receive a request to initiate the transaction from a customer.

In various embodiments, the customer may be located remotely from the establishment when the point-of-sale device 14 receives the request. For example, the request may come from the customer's home, office, car, and/or the like. The customer may possess a mobile device 12 configured to execute an application, such as a mobile or web app, that provides functionality related to the establishment. The point-of-sale device 14 may receive the request from the mobile device 12 of the customer via a network (e.g., network 20).

The point-of-sale device 14 may further receive an indication of the customer's order associated with the transaction. For example, the transaction with the customer may be for the purchase of one or more retail or food items from the establishment.

Subsequent to initiating the transaction, the customer may arrive at the establishment to receive the goods or services associated with the transaction. For example, the customer may arrive at a restaurant to dine on the food order that was previously placed during the transaction.

According to various embodiments, the establishment may detect the presence of the customer in or near the establishment. In this regard, the establishment may be aware that the customer has initiated a transaction and/or placed an order for products or services. The establishment may then determine that the customer has arrived to collect the goods or services. The establishment may detect the presence of the customer without requiring further input from the customer, such as checking in with staff or via a software application.

In some instances, the establishment may use one or more beacons 18 in or near the establishment to facilitate detecting the customer's presence. The beacons 18 may be configured to periodically broadcast a signal. The signal may comprise information about the particular beacon 18 (e.g., a beacon identifier), the establishment where the beacon 18 is located (e.g., a restaurant name or identifier), the position within the establishment where the beacon 18 is located (e.g. a table or zone identifier), and/or the like.

The location of the one or more beacons 18 may be known by the establishment, mobile device 12, and/or point-of-sale device 14. In some instances, the beacons 18 may be placed at relevant areas within the establishment (e.g., a table, a seat at the bar, a pick-up counter, or a point-of-sale device). In other instances, the beacons 18 may be positioned to provide complete or overlapping coverage of the area within and/or near the establishment, for example according to a pattern such as a grid.

The mobile device 12 of the customer may be configured to detect the signal broadcast by the beacons 18. For example, the mobile device 12 may comprise one or more antennas configured to receive such a signal. In some instances, the mobile device 12 may detect the signal without requiring the customer to take any action. For example, the mobile device 12 may be configured to detect the signal while the mobile device 12 is locked or in sleep mode, or without requiring the customer to open a particular application. In this regard, the mobile device 12 may detect the signal while the mobile device 12 is still in the pocket or purse of the customer.

The mobile device 12 may be configured to listen for the signal broadcast by the beacon 18 according to a particular broadcast specification, such as BLE, used by the beacon 18. The mobile device 12 may be configured to decode or extract the data encoded in the signal according to a particular encoding specification used by the beacon 18. In other embodiments, the mobile device 12 may simply pass on the information received from the beacon 18 to the point-of-sale device 14.

In example embodiments, the point-of-sale device 14 may be configured to detect the presence of the customer based at least in part on information received from the mobile device 12 of the customer. In some instances, the point-of-sale device 14 may receive an alert from the mobile device 12 indicating the customer's presence in or near the establishment, for example via an application or operating system executing on the mobile device 12. In other instances, the point-of-sale device 14 may receive data from the mobile device 12 that was received from one or more beacons 18 at the establishment.

The point-of-sale device 14 and/or mobile device 12 may be configured to detect the presence of the customer in or near the establishment based at least in part on information received from a beacon 18. For example, the ability of the mobile device 12 to receive the signal from any of the one or more beacons 18 of the establishment may indicate that the customer is in or near the establishment. In some instances, additional location information (e.g., Global Positioning System (GPS) information, Wi-Fi information, other microlocation information, and/or the like) may be obtained by or from the mobile device 12 that may be used to detect the customer's presence in or near the establishment.

In addition to determining that a customer is in or near the establishment, the point-of-sale device 14 and/or the mobile device 12 may determine the position, zone, or area within the establishment where the customer is located. For instance, a customer may enter a restaurant and select and sit at a particular table or at a particular seat at the bar. The mobile device 12 and/or point-of-sale device 14 may utilize beacon and/or additional location information to determine the customer's location within the establishment.

In some embodiments, the customer's location within the establishment may be determined based on input from a particular beacon 18. For example, a beacon 18 may be associated with a particular area within the establishment (e.g., a table or section at a restaurant). The mobile device 12 may receive the signal from that beacon 18 indicating that the customer is at that location. In this regard, the mobile device 12 may at that time receive a signal from just one beacon 18 of the establishment thereby identifying the location of the customer. The mobile device 12 may be configured to determine the customer's location with respect to that beacon 18 (e.g., proximity to the beacon) based on information gathered from the beacon 18 and/or the signal (e.g., signal strength).

In other embodiments, the customer's location within the establishment may be determined based on input from a plurality of beacons 18. At the customer's location, the mobile device 12 may receive a signal from multiple beacons 18. In some instances, the mobile device 12 may identify the closest beacon 18 based on evaluating values associated with the beacons 18 and/or signals (e.g., signal strength). The mobile device 12 may then determine that the customer is nearest that beacon 18 as well as the customer's proximity to that beacon 18.

In other instances, rather than identifying the nearest beacon 18, the mobile device 12 may determine the customer's location by performing calculations on the information received from the multiple beacons 18 or the signals themselves. In this regard, the mobile device 12 may determine the customer's position by determining the customer's distance from each of the multiple beacons 18 and determining which position within the establishment is located at such distances from the respective beacons 18. The mobile device 12 may perform techniques such as triangulation using the beacon and/or signal information from the one or more beacons 18.

It should be appreciated that the mobile device 12, the point-of-sale device 14, or a combination of the two may be configured to perform the above steps to determine the presence of a customer at or near the establishment and/or to determine the customer's location within the establishment.

According to various embodiments, the point-of-sale device 14 may be configured to enable one or more actions in response to detecting the customer's presence at the establishment.

The customer's order may have been placed with the point-of-sale device 14, in some instances via the mobile device 12, prior to the customer's arrival at the establishment, as described above. In example embodiments, the point-of-sale device 14 may trigger an action associated with the customer after detecting the customer's presence at or near the establishment. For example, in a restaurant establishment, the point-of-sale device 14 may be configured to trigger preparation of the customer's order.

In other example embodiments, the point-of-sale device 14 may receive location information of the mobile device 12 while the customer is en route to the establishment. The point-of-sale device 14 may determine an amount of time necessary to prepare the customer's order. The point-of-sale device 14 may determine an amount of time it will take the customer to arrive at the establishment from his current location. In certain embodiments, the point-of-sale device 14 may be configured to trigger preparation of the customer's order when the customer is within a certain distance or a certain amount of time from the establishment, in some instances based on the determined amount of time for preparing the order.

According to various embodiments, the point-of-sale device 14 may be configured to enable one or more actions in response to detecting the customer's particular location within or near the establishment.

In various embodiments, the point-of-sale device 14 may facilitate an action associated with the customer after detecting the customer's location at a particular position within the establishment. For example, the point-of-sale device 14 may trigger an action after detecting the customer's location at a particular table in a restaurant.

The point-of-sale device 14 may identify the table or seat where the customer has selected to sit. In this regard, the customer may enter the restaurant, select and sit at a table, and the point-of-sale device 14 can detect that the customer has seated herself at the particular table based on the detection of the customer's position within the establishment.

In various embodiments, the customer may change locations within the establishment. For example, the customer may decide that she no longer wishes to sit at the originally selected table and may select a new table. The point-of-sale device 14 may be configured to detect that the customer has changed locations and identify the new location as described above.

After identifying the table or seat where the customer is seated, the point-of-sale device 14 may be configured to associate the customer's order with that particular table.

In some instances, the point-of-sale device 14 may have created a bill for the customer at the time the order was placed. In these instances, the point-of-sale device 14 may retrieve the customer's bill, for example based on customer information provided by the mobile device 12 at the time the mobile device 12 provides the location information, and associate the table or seat identifier of the customer's position with that bill.

In other instances, the point-of-sale device 14 may not have previously created a bill for the customer's order. For example, the point-of-sale device 14 may receive the customer's order from the mobile device 12 at the time that the mobile device 12 provides the customer's location information to the point-of-sale device 14. In these instances, the point-of-sale device 14 may create a bill for the customer, associate the customer's order with the bill, and associate the table or seat identifier of the customer's position with that bill.

In yet other instances, the point-of-sale device 14 may not create a bill for the customer. For example, the customer may have completed payment for the order at the time of placing the order. In these instances, the point-of-sale device 14 may create or retrieve a record associated with the order, rather than creating a bill for the customer, and associate the table or seat identifier of the customer's position with that record.

According to example embodiments, the point-of-sale device 14 may assign staff to the table or seat where the customer is seated. Prior to the customer selecting and sitting at the particular table or seat, there may be no staff assigned to that empty location. The point-of-sale device 14 may, for example, select a staff member associated with an area where the customer's table is located, a staff member that is currently available, or a staff member with the fewest current assignments.

The point-of-sale device 14 may provide an alert to the staff member to attend to the customer at the table or seat where the customer is seated. In this regard, the staff member assigned to the table may be notified of his new table assignment. The point-of-sale device 14 may send the alert via a network connection (e.g., network 20) to a device of the staff member (e.g., a mobile device, mobile point-of-sale device, handheld order input device, and/or the like).

The point-of-sale device 14 may provide the staff member with an indication of one or more items to bring to the customer.

In some instances, the point-of-sale device 14 may provide an indication of one or more items ordered by the customer that are available for delivery. For example, in a restaurant, the point-of-sale device 14 may provide the assigned waiter with an indication of the drink order of the customer so that the drinks may be delivered while the customer's food order is prepared.

In other instances, the point-of-sale device 14 may store customer preference information. The point-of-sale device 14 may retrieve customer preference information and provide the information to the staff member. For example, in a restaurant, the point-of-sale device 14 may retrieve the customer's preferred drink, if not specifically indicated on the order, to enable the staff member to prepare and deliver the drink to the customer without further customer input.

According to certain embodiments, the point-of-sale device 14 may store customer information that may be retrieved and associated with the customer's order. For example, the point-of-sale device 14 may store the customer's name. The point-of-sale device 14 may retrieve the customer's name and provide the name to the staff member to permit the staff member to address the customer by name. In another example, the point-of-sale device 14 may store customer loyalty information. The point-of-sale device 14 may retrieve the customer loyalty information and associate the information with the customer's order automatically without requiring further input from the customer.

In example embodiments, the point-of-sale device 14 may determine that the customer's order is ready for delivery to the customer. In some instances, the point-of-sale device 14 may receive input from a staff member (e.g., a cook at the restaurant) indicating that the order is prepared for delivery. In other instances, the point-of-sale device 14 may receive input from one or more monitoring devices (e.g., a cooking timer or appliance) indicating that the order is prepared for delivery.

The point-of-sale device 14 may provide an alert to the staff member assigned to the customer's table that the customer's order is ready for delivery. For example, the point-of-sale device 14 may send an alert to a mobile device in the possession of the staff member or a point-of-sale device accessible by the staff member. After receiving the alert, the staff member may collect the order and deliver it to the customer.

Various modifications may be made to the above described embodiments within the scope of the invention. It should be understood that the point-of-sale device 14 may be configured to perform certain steps described above with respect to the mobile device 12, and the mobile device 12 may be configured to perform certain steps described above with respect to the point-of-sale device 14. While many embodiments described above are with respect to a restaurant establishment, other establishments (e.g., a retail location) may benefit from various embodiments of the invention.

For example, in some embodiments, the customer's order may be for take-out rather than dine-in. In these embodiments, the customer may place an order prior to arriving at the restaurant, and the customer's presence and position may be detected at the restaurant as the customer waits for the take-out order to be prepared. Similarly, an order at a retail establishment may be placed by the customer prior to arriving, and the order may be collected and delivered to the customer at their detected location.

In other example embodiments, the customer may arrive at a restaurant establishment and seat herself prior to placing the order via the mobile device 12. The customer may, in some embodiments, place the order after arriving at the restaurant but prior to selecting a seat.

In yet other embodiments, the point-of-sale device 14 may receive modifications to the customer's order (e.g., via the mobile device 12) and modify the order accordingly.

In certain embodiments, the mobile device 12 and/or point-of-sale device 14 may detect the customer's presence at or near the establishment and/or position within the establishment using beacons 18 in combination with other wireless technologies or without using beacons 18.

In some embodiments, the point-of-sale device 14 may receive a request for the bill from the customer (e.g., via the mobile device 12). The point-of-sale device 14 may retrieve the bill and the staff member may deliver the bill to the customer or the bill may be delivered electronically (e.g., via the mobile device 12).

In other embodiments, the customer may place an order other than via mobile device 12. For example, the customer may place the order from a desktop computer or over the telephone. In these embodiments, the point-of-sale device 14 may be configured to receive the order from a device other than the mobile device 12 or from input provided by a user of the point-of-sale device 14.

Figure 2:
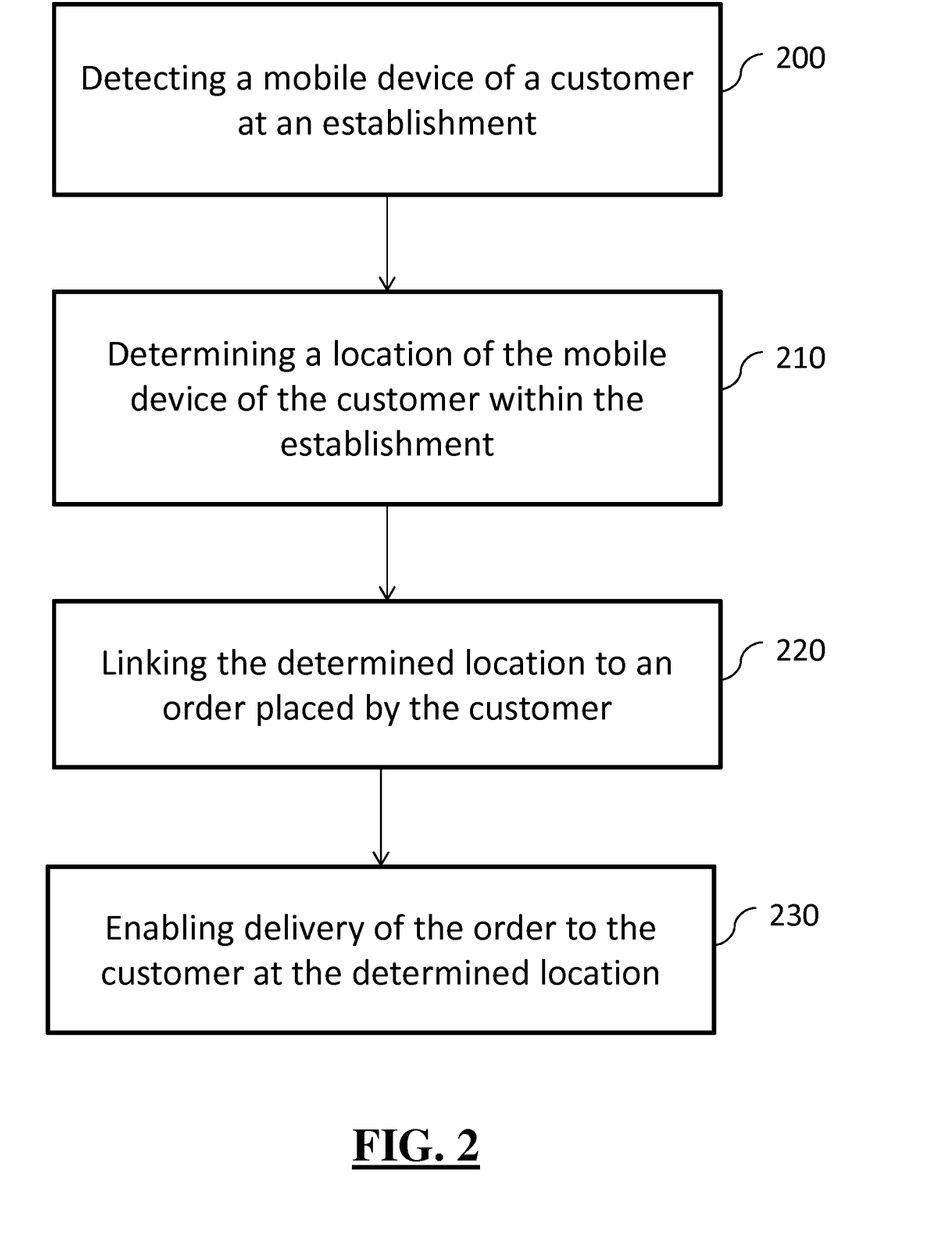
FIG. 2 provides a flowchart for locating a patron and delivering an order according to an embodiment of the present invention.
Figure 5:
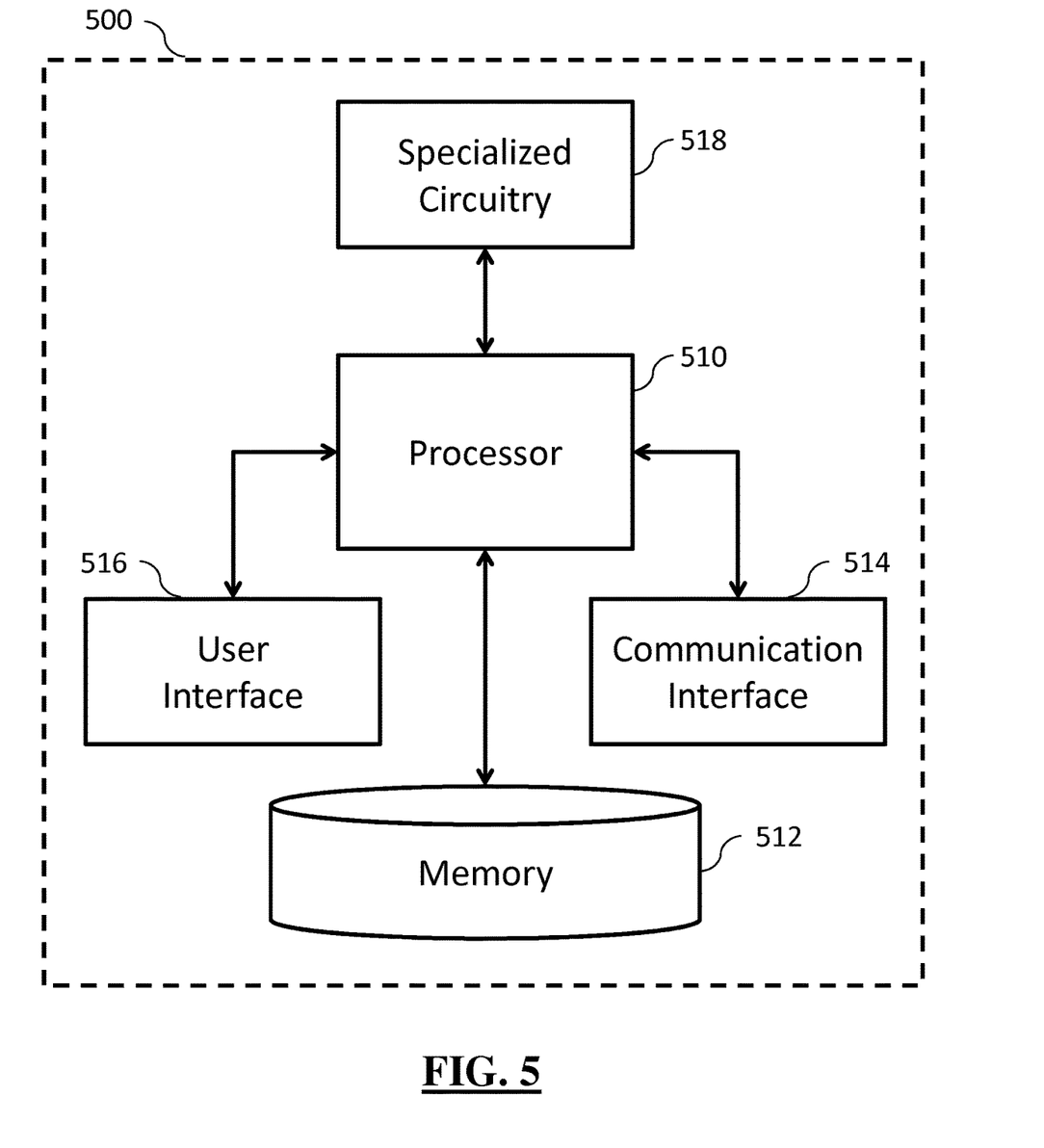
FIG. 5 provides a schematic diagram of a generic apparatus according to an embodiment of the present invention.

FIG. 2 provides a flowchart according to an example method for locating a patron and delivering an order. The operations performed by a method, apparatus, and computer program product of this example embodiment are illustrated from the perspective of an apparatus 500 embodied as a point-of-sale device 14. The apparatus 500 embodied by the point-of-sale device 14 may comprise means, such as the specialization circuitry 518, the processor 510, or the like. In this example embodiment, the various operations may be performed by the specialized circuitry 518 embodied as customer locating circuitry. At operation 200, the example method may comprise detecting a mobile device of a customer at an establishment. The example method may further comprise determining a location of the mobile device of the customer within the establishment at operation 210. At operation 220, the example method may further comprise linking the determined location to an order placed by the customer. The example method may further comprise enabling delivery of the order to the customer at the determined location at operation 230.

Figure 3:
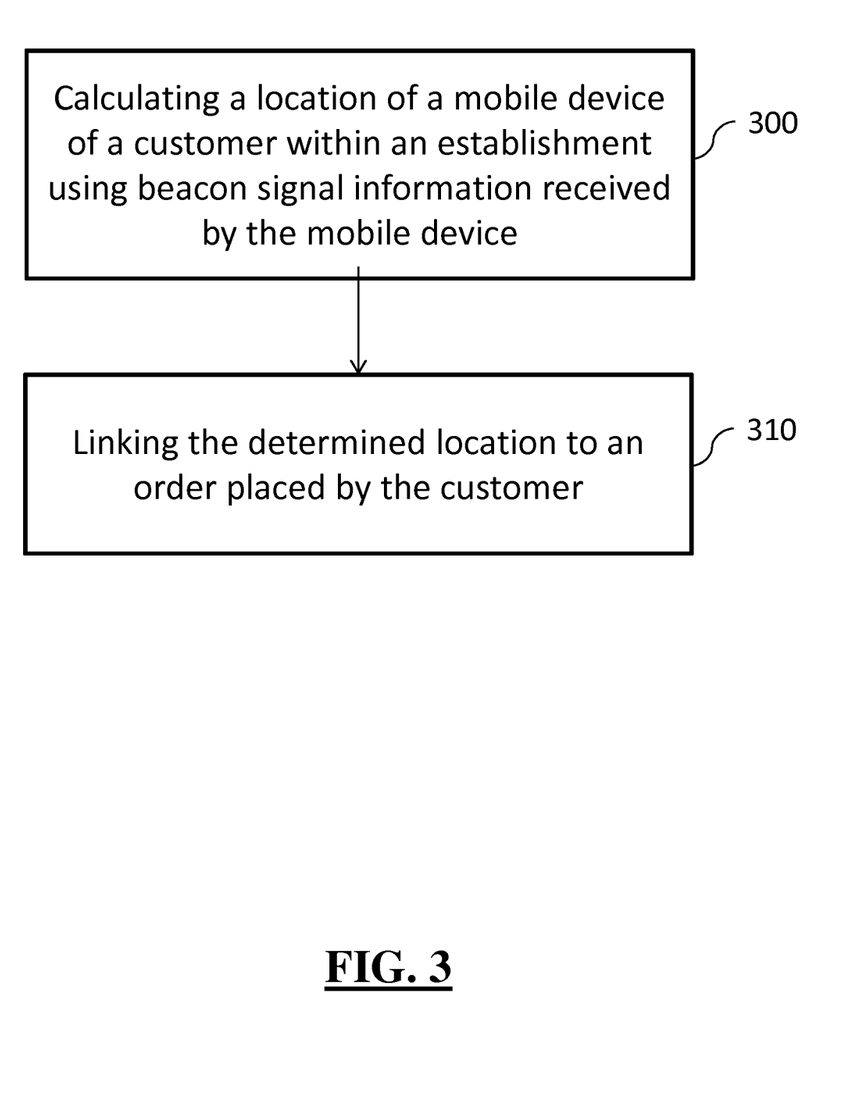
FIG. 3 provides a flowchart for locating a patron and linking an order to that location according to an embodiment of the present invention.

FIG. 3 provides a flowchart according to an example method for locating a patron and linking an order to that location. The operations performed by a method, apparatus, and computer program product of this example embodiment are illustrated from the perspective of an apparatus 500 embodied as point-of-sale device 14. The apparatus 500 embodied by the point-of-sale device 14 may comprise means, such as the specialization circuitry 518, the processor 510, or the like. In this example embodiment, the various operations may be performed by the specialized circuitry 518 embodied as check retrieval circuitry. At operation 300, the example method may comprise calculating a location of a mobile device of a customer within an establishment using beacon signal information received by the mobile device.

The example method may further comprise linking the determined location to an order placed by the customer at operation 310.

Figure 4:
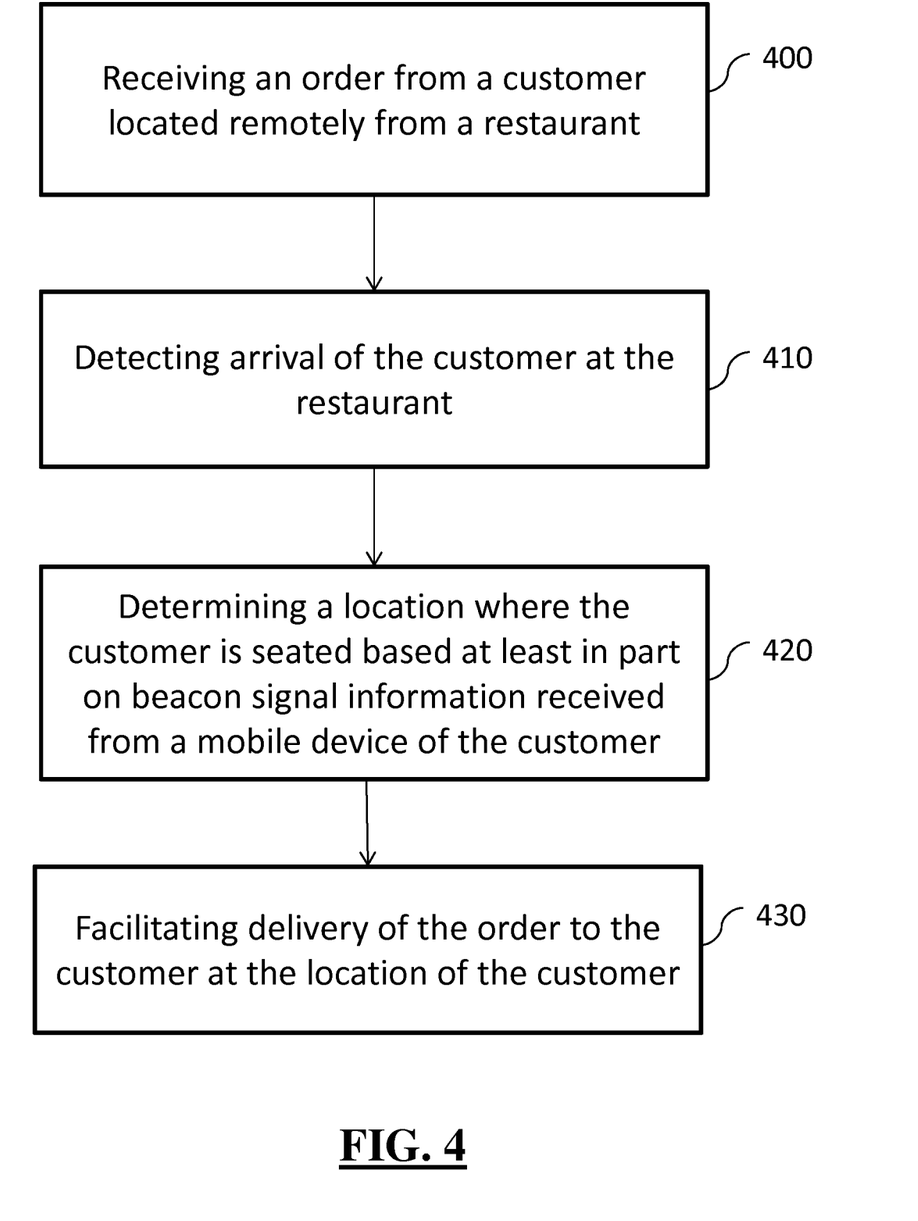
FIG. 4 provides a flowchart for locating a patron and delivering an order according to an embodiment of the present invention.

FIG. 4 provides a flowchart according to an example method for locating a patron and delivering an order. The operations performed by a method, apparatus, and computer program product of this example embodiment are illustrated from the perspective of an apparatus 500 embodied as a point-of-sale device 14. The apparatus 500 embodied by the point-of-sale device 14 may comprise means, such as the specialization circuitry 518, the processor 510, or the like. In this example embodiment, the various operations may be performed by the specialized circuitry 518 embodied as customer locating circuitry. At operation 400, the example method may comprise receiving an order from a customer located remotely from a restaurant. The example method may further comprise detecting arrival of the customer at the restaurant at operation 410. At operation 420, the example method may further comprise determining a location where the customer is seated based at least in part on beacon signal information received from a mobile device of the customer. The example method may further comprise facilitating delivery of the order to the customer at the location of the customer at operation 430.

Various embodiments provide numerous benefits and advantages to both customers and merchants. The following advantageous embodiments will be described with respect to a restaurant establishment for convenience, but it should be appreciated that these advantages may also apply with respect to other establishments.

Some advantageous embodiments enable a restaurant point-of-sale device to permit a customer to place an order from his mobile device, detect when the customer has arrived at the restaurant, begin preparing the customer's order after detecting his arrival, calculate where the customer has elected to sit, and enable delivery of the order to the customer when the order is ready.

According to various advantageous embodiments, the customer may be permitted to place the order while remote from the restaurant, while waiting in the lobby of the restaurant, or even while already seated.

In example advantageous embodiments, the point-of-sale device may be able to detect that the customer has arrived without any further input from the customer. In some instances, the point-of-sale device may detect the customer's presence without requiring the customer to interact with any staff of the restaurant or require any input from the restaurant staff. In other instances, the point-of-sale device may detect the customer's presence without requiring the customer to check-in with the restaurant using an application on the customer's mobile device. In yet other instances, the point-of-sale device may detect the customer's presence without even requiring the customer to remove her mobile device from her pocket or purse.

In certain advantageous embodiments, the point-of-sale device may determine a suitable time to begin preparing the customer's order. For example, the point-of-sale device may wait to begin preparing the customer's order until the customer arrives at the restaurant, particularly in a quick service restaurant. These embodiments avoid a restaurant preparing a customer's order too early and the order becoming cold or stale before the customer arrives or before the order can be delivered. It may also avoid delaying preparation of an order too long while trying to determine that the customer has arrived or even while the customer is being seated.

In various advantageous embodiments, the point-of-sale device may be able to determine where the customer is seated without any further input from the customer or a staff member. For example, the customer may place an order from her mobile device, enter the restaurant, and sit at any free seat or table without any interaction with the restaurant staff or the mobile device beyond placing the initial order. The point-of-sale device may use information gathered by the customer's mobile device from beacons or other wireless devices in the restaurant to determine the customer's location. A customer may even place an order after selecting a seat in the restaurant without any interaction with the staff and without providing any identification of the customer's location when placing the order.

The operations of the methods described herein may be carried out in any suitable order, or simultaneously where appropriate. The methods described herein may be performed by software in machine readable form on a tangible storage medium or as a propagating signal.

In various embodiments, a mobile device 12, point-of-sale device 14, and/or a server 16 may be embodied as or otherwise include an apparatus 500 as generically represented by the block diagram of FIG. 5. In the example embodiment, the apparatus 500 may comprise various means for performing the various functions herein described. These means may comprise one or more of a processor 510, memory 512, communication interface 514, user interface 516, or specialized circuitry 518. The various means may be in communication with one another, such as via a bus.

The means of the apparatus 500 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 512) that is executable by a suitably configured processing device (e.g., the processor 510), or some combination thereof. In some example embodiments, the processor 510, memory 512, communication interface 514, user interface 516, and/or specialized circuitry 518 may be embodied as a chip or chip set.

The processor 510 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 5 as a single processor, in some embodiments the processor 510 may comprise a plurality of processors. The plurality of processors may be in operative communication with each other and may be collectively configured to perform one or more functionalities of the apparatus 500 as described herein. The plurality of processors may be embodied on a single device or distributed across a plurality of devices collectively configured to function as the apparatus 500.

In some example embodiments, the processor 510 may be configured to execute instructions stored in the memory 512 or memory otherwise accessible to the processor 510. These instructions, when executed by the processor 510, may cause the apparatus 500 to perform one or more of the functionalities of the apparatus 500 as described herein. Further, the processor 510 may comprise functionality to operate one or more software programs, which may be stored in memory. For example, the processor 510 may be capable of operating a connectivity program, such as a web browser. The connectivity program may allow the apparatus 500 to transmit and receive web content, such as location-based content, according to a protocol, such as Wireless Application Protocol (WAP), hypertext transfer protocol (HTTP), and/or the like. The apparatus 500 may be capable of using protocol(s), such as Transmission Control Protocol/Internet Protocol (TCP/IP), to transmit and receive web content across the internet or other networks.

The memory 512 may comprise, for example, volatile memory, non-volatile memory, or some combination thereof. In this regard, the memory 512 may comprise one or more tangible and/or non-transitory computer-readable storage media that may include volatile and/or non-volatile memory. Although illustrated in FIG. 5 as a single memory, the memory 512 may comprise a plurality of memories. The plurality of memories may be embodied on a single device or may be distributed across a plurality of devices collectively configured to function as the apparatus 500. In various example embodiments, the memory 512 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 512 may be configured to store information, data, applications (e.g., software programs), instructions, and/or the like, in some instances for execution by the processor 510, for enabling the apparatus 500 to carry out various functions in accordance with various example embodiments.

The communication interface 514 may be embodied as any device or means embodied in circuitry, hardware, a computer program product comprising computer readable program instructions stored on a computer readable medium (for example, the memory 512) and executed by a processing device (for example, the processor 510), or a combination thereof that is configured to receive and/or transmit data from/to another computing device. The communication interface 514 may include, for example, an antenna, a transmitter, a receiver, a transceiver, and/or supporting hardware or software for enabling communications with one or more remote devices. The communication interface 514 may be configured to receive and/or transmit data using any protocol that may be used for communications between devices.

The user interface 516 may be in communication with the processor 510 to receive an indication of a user input and/or to provide an audible, visual, mechanical, or other output to a user. As such, the user interface 516 may include, for example, a keyboard, keypad, scanner, printer, mouse, joystick, display (e.g., touch screen display), microphone, speaker, and/or other input/output mechanisms. The processor 510 and/or user interface circuitry comprising the processor 510 may be configured to control one or more functions of the user interface 516 through computer program instructions (e.g., software and/or firmware) stored on memory (e.g., memory 512) accessible to the processor 510.

The specialized circuitry 518 may be embodied as various means, such as circuitry, hardware, a computer program product comprising computer readable program instructions stored on a computer readable medium (for example, the memory 512) and executed by a processing device (for example, the processor 510), or some combination thereof and, in some embodiments, is embodied as or otherwise controlled by the processor 510.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:

receiving, by a processor of a Point-Of-Sale (POS) device, an order placed on a mobile device operated by a customer from a remote location of an establishment;

receiving, by the processor of the POS device, en route location information from the mobile device of the customer while the customer is en route to the establishment from the remote location, wherein the mobile device is a smartphone device of the customer;

determining, by the processor of the POS device, an amount of time necessary to prepare the order placed by the customer with the establishment;

triggering, by the processor of the POS device, preparation of the order when a current location of the mobile device, obtained from the en route location information, is detected as being at a certain distance from the establishment, wherein the certain distance is a particular distance that takes the amount of time to travel the particular distance to the establishment;

detecting, by the processor of the POS device, the mobile device of the customer at the establishment;

determining, by the processor of the POS device, a location of the mobile device of the customer within the establishment based on the mobile device connection to a particular beacon from a plurality of beacons within the establishment arranged in a pattern as a grid and based on the location of the particular beacon within the establishment, wherein determining further includes determining a determined location of the customer within the establishment; (i) without customer input, (ii) without the customer operating the mobile device of the customer, (iii) while the mobile device is located in a pocket or a purse of the customer, and (iv) when the mobile device is in a locked or sleep mode of operation, wherein determining further includes identifying a table that the customer selected to sit at when entering the establishment based on an association between the particular beacon and the table within the establishment, wherein each of the plurality of beacons periodically broadcast a signal that includes a beacon identifier, an establishment identifier, and a position of that beacon within the establishment, wherein determining further includes receiving by the POS device the signal of the particular beacon transmitted by the mobile device proximate to the table;

linking, by the processor of the POS device, the determined location to the order placed by the customer from the mobile device, wherein the order is placed via interactions with the POS device;

determining, by the POS device, a changed location for the mobile device within the establishment based on movement of the customer from the determined location;

updating, by the POS device, the determined location based on the changed location;

receiving, by the POS device, an indication from an appliance monitoring device that indicates the order is ready for delivery to the customer;

obtaining, by the POS device, a name associated with the customer of the order;

obtaining, by the POS device, preferences of the customer;

providing, by the POS device, item indications for items of the order that are to be brought to the customer for the order, the name for the customer, the preferences of the customer along with a preferred drink of the customer missing from the order, and the determined location of customer to a staff member assigned to serve the determined location;

enabling, by the processor of the POS device, delivery of the order to the customer at the determined location through the providing and without the customer being required to perform any check-in for the order with the establishment and without the customer using the mobile device to perform any check-in for the order with the establishment;

determining, by the POS device, a loyalty account of the customer; and associating, by the POS device, the order with the loyalty account of the customer.

2. The method of claim 1, wherein determining the location further comprises:

determining the location based on signal information received from the mobile device, the signal information comprising information related to at least one signal received by the mobile device from the particular beacon located at the establishment.

3. The method of claim 2, wherein the signal information comprises signal strength information for each of the at least one signals, and wherein determining the location further comprises:

calculating the location based on the signal strength information of the at least one signals.

4. The method of claim 1, accepting receipt of the order from the customer prior to detecting the mobile device of the customer at the establishment.

5. A method comprising:

receiving, by a processor of a Point-Of-Sale (POS) device, an order placed by a customer while operating a mobile device from a remote location of an establishment, wherein the mobile device is a smartphone device of the customer;

receiving, by the processor of the POS device, en route location information from the mobile device of the customer while the customer is en route to the establishment;

determining, by the processor of the POS device, an amount of time necessary to prepare the order placed by the customer with the establishment;

triggering, by the processor of the POS device, preparation of the order when a current location of the mobile device, obtained from the en route location information, is detected as being at a certain distance from the establishment, wherein the certain distance is a particular distance from the establishment that takes the amount of time to travel the particular distance to the establishment;

calculating, by the processor of the POS device, a location of the mobile device of the customer within the establishment using beacon signal information received by the mobile device connected to a particular beacon from a plurality of beacons within the establishment arranged in a pattern of a grid and based on the location for the particular beacon within the establishment, wherein calculating further includes determining a determined location of the customer within the establishment: (i) without customer input, (ii) without the customer operating the mobile device of the customer, (iii) while the mobile device is located in a pocket or a purse of the customer, and (iv) when the mobile device is in a locked or sleep mode of operation, wherein calculating further includes identifying a table that the customer selected to sit at when entering the establishment based on an association between the particular beacon and the table within the establishment, wherein each of the plurality of beacons periodically broadcast a signal that includes a beacon identifier, an establishment identifier, and a position of that beacon within the establishment, wherein determining further includes receiving by the POS device the signal of the particular beacon transmitted by the mobile device proximate to the table;

linking, by the processor of the POS device, the determined location for the mobile device to the order placed by the customer from the mobile device, wherein the order is placed through interactions with the POS device, without the customer being required to perform any check-in for the order with the establishment and without the customer using the mobile device to perform any check-in for the order with the establishment;

determining, by the processor of the POS device, a changed location for the mobile device within the establishment based on movement of the customer from the determined location;

updating, by the processor of the POS device, the determined location based on the changed location;

receiving, by the POS device, an indication from an appliance monitoring device that indicates the order is ready for delivery to the customer;

obtaining, by the POS device, a name associated with the customer of the order;

obtaining, by the POS device, preferences of the customer;

providing, by the POS device, item indications for items of the order that are to be brought to the customer for the order, the name for the customer, the preferences of the customer along with a preferred drink of the customer missing from the order, and the determined location of customer to a staff member assigned to serve the determined location;

determining, by the POS device, a loyalty account of the customer; and associating, by the POS device, the order with the loyalty account of the customer.

6. The method of claim 5, wherein the beacon signal information comprises signal strength information, and wherein calculating the location comprises:
- calculating the location based on the signal strength information of a plurality of beacon signals received by the mobile device.

7. A method comprising:
- receiving, by a processor of a Point-Of-Sale (POS) device, an order from a customer placed by the customer while operating a mobile device of the customer at a remote location from a restaurant, wherein the mobile device is a smartphone device of the customer;
- receiving, by the processor of the POS device, en route location information from the mobile device of the customer while the customer is en route to the restaurant;
- determining, by the processor of the POS device, an amount of time necessary to prepare the order placed by the customer with the restaurant;
- triggering, by the processor of the POS device, preparation of the order when a current location of the mobile device, obtained from the en route location information, is detected as being at a certain distance from the restaurant, wherein the certain distance is a particular distance from the restaurant that takes the amount of time to travel the particular distance in order to reach the establishment necessary to prepare the order;
- detecting, by the processor of the POS device, arrival of the customer at the restaurant;
- determining, by the processor of the POS device, a location where the customer is seated at a table within the restaurant based at least in part on beacon signal information received from a mobile device of the customer that is connected to a particular beacon from a plurality of beacons arranged in a pattern of a grid at the location within the restaurant, wherein determining further includes determining a determined location of the customer within the restaurant: (i) without customer input, (ii) without the customer operating the mobile device of the customer, (iii) while the mobile device is located in a pocket or a purse of the customer, and (iv) when the mobile device is in a locked or sleep mode of operation, wherein each of the plurality of beacons periodically broadcast a signal that includes a beacon identifier, a restaurant identifier, and a position of that beacon within the restaurant, wherein determining further includes receiving by the POS device the signal of the particular beacon transmitted by the mobile device proximate to the table;
- determining, by the processor of the POS device, a changed location for the mobile device within the establishment based on movement of the customer from the determined location;
- updating, by the POS device, the determined location based on the changed location;
- receiving, by the POS device, an indication from an appliance monitoring device that indicates the order is ready for delivery to the customer;
- obtaining, by the POS device, a name associated with the customer of the order;
- obtaining, by the POS device, preferences of the customer;
- providing, by the POS device, item indications for items of the order that are to be brought to the customer for the order, the name for the customer, the preferences of the customer along with a preferred drink of the customer associated with the preferences but missing from the order, and the determined location of customer to a staff member assigned to serve the determined location; and
- facilitating, by the processor of the POS device, delivery of the order to the customer at the determined location of the customer through the providing, without the customer being required to perform any check-in for the order with the establishment and without the customer using the mobile device to perform any check-in for the order with the establishment;
- determining, by the processor of the POS device, a loyalty account of the customer; and
- associating, by the processor of the POS device, the order with the loyalty account of the customer.

8. The method of claim 7, wherein the beacon signal information comprises beacon signal information received by the mobile device from the particular beacon located at the restaurant, and wherein the beacon signal information received from the mobile device comprises beacon signal information from each of the plurality of beacons.

9. The method of claim 8, wherein the beacon signal information comprises signal strength information of the signal from the particular beacon, and wherein determining the location further comprises:
- calculating the location based on the signal strength information of the signal from the particular beacon.

10. The method of claim 7, further comprising:
- linking the determined location to the order from the customer.

11. The method of claim 7, further comprising:
- accepting receipt of the order from the customer prior to detecting arrival of the customer at the restaurant.

* * * * *